Oct. 25, 1932.                R. H. WRIGHT                    1,884,483
                    APPARATUS FOR TREATING VEGETATION
                           Filed Dec. 29, 1931
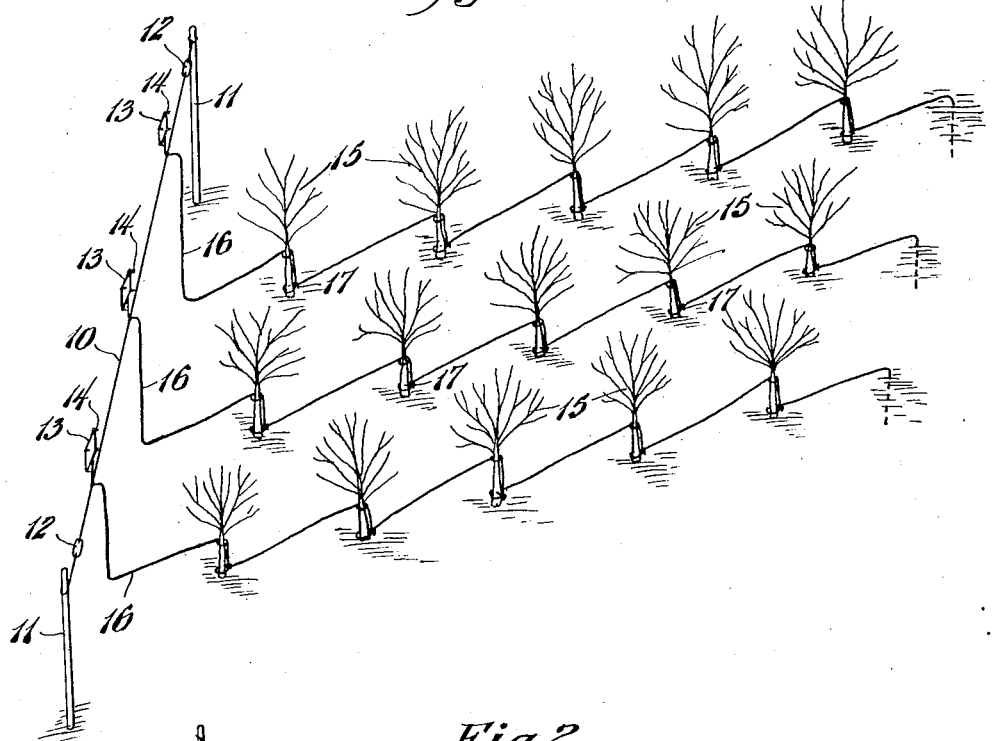
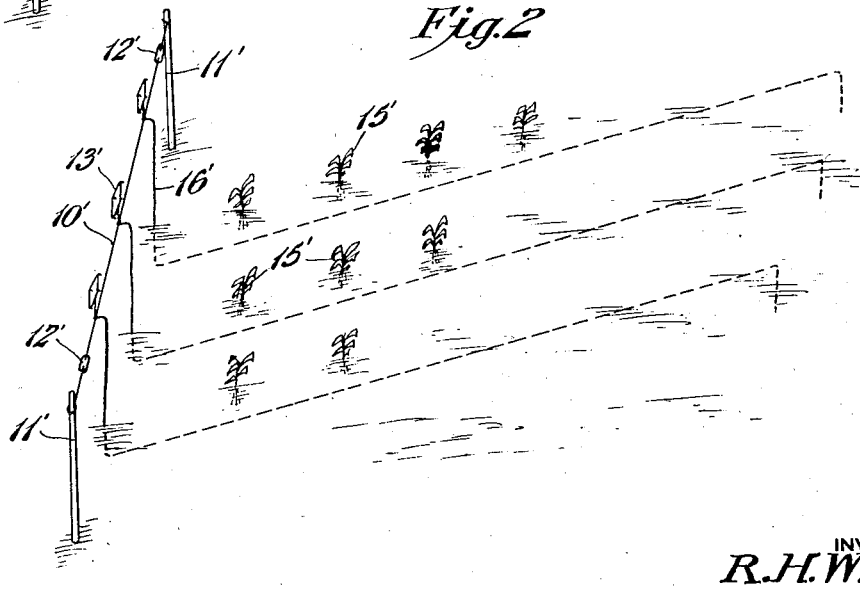
INVENTOR
R. H. Wright
BY A. D. Adams
ATTORNEY Patented Oct. 25, 1932

1,884,483

UNITED STATES PATENT OFFICE

ROBERT H. WRIGHT, OF NASHVILLE, TENNESSEE

APPARATUS FOR TREATING VEGETATION

Application filed December 29, 1931. Serial No. 583,774.

This invention relates to apparatus for treating vegetation, including growing trees, vines, plants and the like, with atmospheric electricity and, among other objects, aims to provide a simple and inexpensive system of electrical collectors and conductors arranged to be connected to rows of trees, etc., so as to convey collected atmospheric electricity through their trunks or roots and thereby protect them from certain harmful microbes or bacteria and insects, as well as furnish a certain amount of fertilization or plant nourishment.

Other aims and advantages of the invention will apear in the specification when considered in connection with the accompanying drawing, wherein:

Fig. 1 is a perspective view of the preferred form of aparatus showing it applied to several rows of trees; and Fig. 2 is a similar perspective view showing the apparatus applied to rows of growing plants.

Referring particularly to Fig. 1, an antenna 10 of suitable conducting material is shown as being supported at a suitable height above the ground by means of a pair of poles or posts 11 and is insulated from the poles or posts by insulators 12. The height of the antenna may be 20 feet or more above the ground and its capacity for collecting atmospheric electricity is preferably augmented by a series of collectors 13 which, in this instance, are composed of electrical conductors or wire loops bent in rectangular form having spikes 14 at their corners.

While any number of collectors 13 may be electrically connected to the antenna, there are preferably as many as there are rows of trees 15 to be treated. In this instance, the rows of trees extend substantially at right angles to a line between the supporting posts and, at spaced intervals, conductors 16 lead from the antenna at the points of connection between the collectors and the antenna and each conductor is shown as being connected successively to all of the trees in a row. The idea is to convey current from the antenna to the trunks of the trees so as to give the most beneficial results.

Any effective type of connection to the individual trees may be employed to provide a good current conducting path through the trees. In this example, the conductors are first looped or wrapped about the trunks of the trees immediately below the branches; then led downwardly to a point near the ground, where they are looped again about the trees. To insure good electrical contact, the lower loops are shown as being also wound on spikes or nails 17 driven into the trunks of the trees. This mechanical and electrical connection to the trees prevents the conductors from being broken loose very easily. From the lower loop or connection to each tree each conductor preferably extends to the next tree and is wound about the upper portion of its trunk to provide the upper connection. However, this mode of connection may be varied.

At the end of each row of trees, the conductor for that row is preferably, though not necessarily grounded either by burying the conductor in the ground or connecting it to a metal conductor driven about three feet in the ground. However, the depth of the ground connection may be varied according to the number of trees to be treated and the character of the soil.

The apparatus shown in Fig. 1 is applicable not only to trees, but to all woody shrubs, vines and the like which provide trunks or bodies to which the conductors may be electrically connected. In some instances, however, the spikes in the trunks will be displaced by other means for making good electrical contact between the conductors and the shrubs or vines to be treated.

Referring to Fig. 2, the apparatus is shown as being applied to rows of growing plants 15'. The antenna 10', supporting posts 11' and collectors 13' are the same as in Fig. 1. In this instance, however, the branch conductors, of which there are as many as there are rows of plants to be treated, lead from the antenna directly to the ground and extend under the ground below the separate rows of plants. While the depth of the conductors below the rows may be varied, depending upon the character of the plants to be treated, it has been found that a depth of a foot or more produces satisfactory results. Thus, the buried conductors avoid interference with tillage tools used in the cultivation of the plants and the electricity is delivered to the roots of the plants instead of to their trunks. In this instance, the conductors are likewise grounded at the end of each row by extending them downwardly to a depth of two feet or more at their ends. Also, the depth to which the grounded ends extend, may vary in accordance with the character of the soil.

From the foregoing description, it will be seen that the improved apparatus is very simple and easy to install. A single antenna may be used for a whole orchard and arranged at such height as to afford sufficient capacity to treat all of the trees. It is only necessary to use ordinary copper or galvannized wire to make the connections to the trees. Likewise, the system is very easy to install in a field for the treatment of growing plants of various kinds. Installations have demonstrated that very beneficial results are obtained. Harmful bacteria and fungus growths, as well as some types of insects have been destroyed and the conducted electricity affords some fertilization or plant nourishment which promotes growth.

Obviously, the invention is not limited to the particular embodiments thereof herein shown and described.

What is claimed is:

1. Apparatus for treating growing vegetation, including trees, plants and the like with electricity collected from the atmosphere comprising, in combination, an elevated antenna insulated from its supports and having a series of electrically connected, metallic collectors; a multiplicity of electrical conductors extending from the antenna and electrically connected at vertically spaced points to the trees and deeply grounded at one end, being arranged in such a manner as to provide a metallic path for the collected electricity to promote growth and destroy certain insects and microbes.

2. Apparatus for treating growing vegetation including trees and the like, comprising an antenna; means supporting the antenna at the desired height above the ground and insulated from the antenna; a plurality of metallic collectors electrically connected to the antenna; and a conductor leading from the antenna to the trees or plants to be treated and deeply grounded at its other end thereby providing a current conducting path to the trees or plants.

3. Apparatus for treating rows of trees with atmospheric electricity comprising, in combination, an antenna supported by poles at an effective height above the ground and insulated from said poles; means connected to the antenna for collecting static electricity from the air; a plurality of conductors providing current-conducting paths from the antenna to the trees; spikes driven at spaced points into the trees to afford good electrical contact with the conductors, the ends of said conductors being deeply grounded at the termination of each row of trees.

In testimony that I claim the foregoing as my own, I have hereto affixed my signature.

ROBERT H. WRIGHT.